March 7, 1944.  G. H. ZENNER  2,343,727
VAPORIZING DEVICE
Filed April 26, 1941
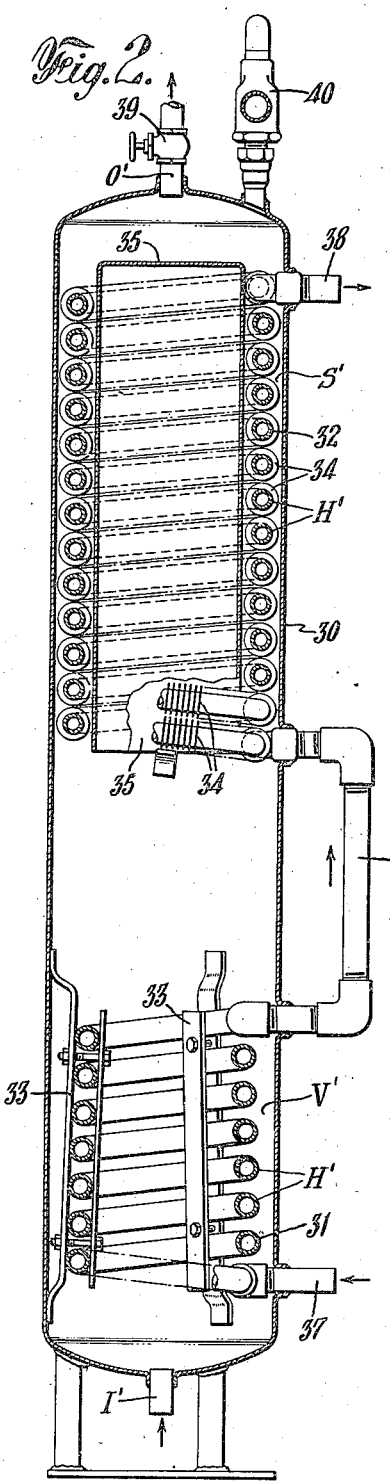
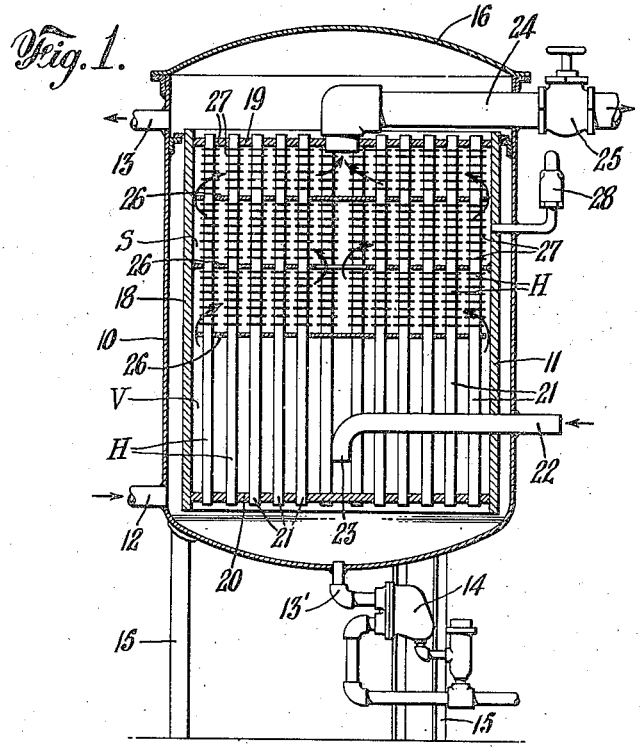
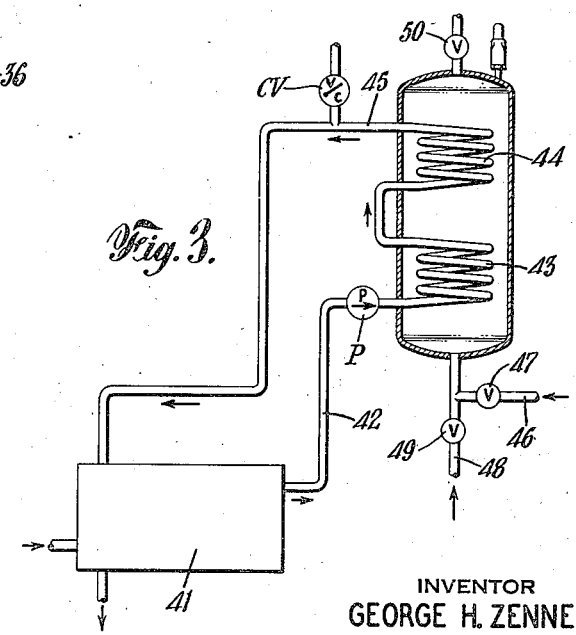
INVENTOR
GEORGE H. ZENNER
BY
ATTORNEY Patented Mar. 7, 1944

2,343,727

UNITED STATES PATENT OFFICE 2,343,727

VAPORIZING DEVICE

George H. Zenner, Kenmore, N. Y., assignor to The Linde Air Products Company, a corporation of Ohio Application April 26, 1941, Serial No. 390,495

12 Claims. (Cl. 62—1)

This invention relates to a method and apparatus for vaporizing volatile liquids and more particularly to a method and apparatus for vaporizing volatile liquids such as oxygen, nitrogen and the like, having boiling point temperatures below 233° K. at atmospheric pressure.

The development of apparatus consuming relatively large amounts of oxygen, particularly apparatus for the thermochemical desurfacing of ferrous metal bodies, such as billets, ingots, blooms and the like, has resulted in the need for a source of oxygen gas which is capable of meeting sudden and prolonged demands for a large amount of such gas at uniform quality without a deleterious decrease in pressure.

Heretofore, attempts have been made to employ, as a source of gaseous oxygen for heavy duty commercial requirements, a manifold associated with a battery of heavy portable cylinders containing compressed oxygen, but due to the relatively small amount of gas contained in each cylinder and the relatively large number of cylinders which must be employed, this type of an oxygen source has not been entirely satisfactory. In order to reduce the cost of transportation of oxygen it has been proposed to ship and store the latter in the liquid state in suitable insulated containers and to vaporize it as required according to demand. Known liquid oxygen vaporizers have been constructed somewhat similar to conventional steam-to-liquid heat exchanging equipment, i. e., liquid oxygen is passed through a tube which is surrounded with steam, hot water, hot air or the like, and in this type of apparatus both vaporization of the liquid and superheating of the resulting vapor occur in a single pass through the tube. When liquid oxygen is vaporized in this known type of equipment, the great expansion of the liquid oxygen incident to its vaporization necessarily results in a greatly increased speed of travel of both liquid and vapor through the tube. Under conditions of high rates of heat transfer, the speed of travel may be so high as to cause liquid oxygen to be carried in surges entirely through the tube into the vapor superheating portion of the apparatus, thus causing undesirable surging and priming conditions within the vaporizer. Under such conditions of surging or priming, not only is a "wet" oxygen gas delivered but the output of gaseous oxygen may be reduced to such an extent that the efficacy of the oxygen consuming equipment may be seriously affected.

Accordingly, the primary object of this invention is to provide an improved method and apparatus for vaporizing a volatile liquid, particularly a liquefied gas such as oxygen, nitrogen, and the like, having a boiling point temperature below 233° K. at atmospheric pressure, and superheating such vapor to a comparatively uniform temperature under all conditions of heavy duty commercial requirements, such method and apparatus being adapted to overcome the above and other difficulties encountered in the operation of the heretofore known liquefied gas vaporizers.

It is among the objects of the invention to provide a method and apparatus for vaporizing a liquefied gas such as oxygen, nitrogen, and the like, by vaporizing a bath of liquefied gas at a rate such that the linear velocity of the resulting vapor is less than approximately one foot per second; to provide a method and apparatus for vaporizing a bath of liquefied gas by passing a heating medium through said bath in indirect contact therewith, the rate of heating and the gas releasing surface of said bath being so related that the linear velocity of the vapor leaving said surface is below approximately one foot per second and preferably below five-tenths foot per second, and thereafter superheating said vapor by passing it at relatively higher velocities in indirect contact with said heating medium after the latter has passed through said bath.

The above and other objects and novel features of the invention will become apparent from the drawing, showing a liquefied gas vaporizer constructed and arranged in accordance with the invention.

Fig. 1 is an elevational sectional view of one modification of the vaporizer of the invention;

Fig. 2 is an elevational sectional view of another modification of the vaporizer of the invention; and Fig. 3 is a schematic diagram of the vaporizer arranged in operative relation with a suitable source of heat.

With the reference to the drawing, the principles of the invention are shown as applied to a liquid oxygen vaporizer, comprising, as a unitary assembly, a liquid vaporizing portion or chamber V or V' and disposed in spaced relation to the latter, a vapor superheating portion or chamber S or S'. Heating elements H and H' disposed in the vaporizing portion V or V' and superheating portion S and S' are so constructed and arranged as to permit a heating medium to flow first through the vaporizing element and thereafter through the superheating element. Thus, the heating medium and vapor to be superheated flow in a generally parallel manner through the vaporizer of this invention. Not only is such flow the reverse of that employed in accepted boiler practice but it permits the largest difference of temperature to occur between liquefied gas and heating medium. After heating medium is supplied to the vaporizer, a liquefied gas, such as liquid oxygen is introduced into and vaporized in the vaporizing portion or chamber V or V' at a relatively low and uniform rate. The heating surface H or H' of the vaporizing chamber is so constructed and arranged with respect to the vapor releasing surface of the bath of liquefied gas as to permit the vapor leaving said surface, under all load conditions on the vaporizer, to have a linear velocity not in excess of about one foot per second and preferably not in excess of about 0.5 foot per second. This low velocity avoids the possibility of carrying any liquefied gas into the superheater portion of the vaporizer. After the vapor is formed it is permitted to maintain the above mentioned low velocity for a relatively short distance above the surface of the bath of liquefied gas to insure the complete avoidance of entrainment of any liquefied gas in the vapor. At a suitable point above the normal liquid level, the gas is superheated to approximately room temperature by permitting it to pass at relatively higher velocities over a suitable heating element which is preferably finned to increase the surface contact between the latter and the vapor. The vapor may be passed several times across the superheating elements, e. g., by suitably arranged baffles, or the vapor may be made to traverse a bank or coil of closely spaced superheating elements. The heating medium, which may comprise any suitable fluid such as water, steam, gas or the like, is passed first through the vaporizing heating element or elements, and thereafter through the superheating element or elements. If desired, electrical heaters may be provided at suitable points within the vaporizer to supply the necessary heat. Preferably fluid heating elements are employed and by permitting the heating medium to pass first through the vaporizing heating elements and thereafter through the superheating elements of the vaporizer, a smooth and uniform vaporization of the liquefied gas and a uniform degree of superheat is imparted to such vapor even under severe load conditions. Due to the nature of liquid oxygen vaporization, the metal heating surface assumes a temperature much closer to the temperature of the heating medium than to the temperature of liquid oxygen. By permitting indirect parallel flow of heating medium and vapor, freeze-up difficulties are avoided and at the same time conversion of liquid to vapor exactly in accordance with demands is insured.

With reference to Fig. 1 the vaporizer comprises an outer casing 10 and an inner enclosed heating shell 11, suitably secured in a conventional gas tight manner at its upper portion to the outer casing. A heating fluid inlet 12 is disposed in the lower portion of the outer shell 10 and a heating fluid outlet 13 may be disposed in the outer casing 10 at a point above the upper end of the heating shell 11. If steam is employed as a heating medium, the outlet conduit 13' is preferably disposed in the lowermost point of the outer shell and such conduit may be provided with a conventional steam trap 14. Suitable supporting members 15 are provided beneath the lower end of the outer casing 10, and the upper portion thereof may be provided with a cover 16.

The enclosed heating shell 11 comprises a vertical cylindrical casing 18 having tube sheet members 19 and 20 secured respectively in gas tight relation to the upper and lower ends thereof. A plurality of vertically disposed heating tubes 21 extend the full length of the casing 18 and the ends of each heating tube 21 are secured in a conventional gas tight manner to each tube sheet 19 and 20 respectively, to form heating fluid communicating passages between the upper and lower portions of the outer casing. A liquefied gas inlet conduit 22 extends from the exterior of the vaporizer to about the center of, and terminates in a downwardly extending discharge orifice 23 slightly above the lower tube sheet 20. A gaseous discharge conduit 24 is centrally disposed in the upper tube sheet 19 and extends to the exterior of the vaporizer. A control valve 25 is provided in outlet conduit 24 for regulating the rate of gas delivery. Normally no control valve is inserted in inlet conduit 22 between the source of liquefied gas, e. g., liquid oxygen and the vaporizer, since the pressure of oxygen gas which is developed in the enclosed heating shell 18, upon the closing of valve 25, is sufficient to force the residual liquid oxygen remaining in the vaporizer back through conduit 22 to the liquid oxygen storage tank, thus preventing further vaporization.

Within the heating shell 18 and at suitably disposed points above the normal liquid level a plurality of baffles 26 are provided to cause the vapor formed in the lower portion of the vaporizer to make several transverse passes across the upper portion of the heating tubes 21. In order to secure the maximum surface contact between the heating tubes 21 and the vapor, the former are provided with fins 27 along the portion of the tubes located between the lower baffle 26 and the upper tube sheet 19. A safety valve 28 is secured to the upper portion of the inner shell 11 to vent excess gas pressure therein to the atmosphere.

During operation steam or other suitable heating fluid is passed upwardly through the tubes 21 and around the shell 11 of the vaporizer. Liquid oxygen or other suitable liquefied gas is thereafter introduced through conduit 22 by opening valve 25 and releasing residual pressure within the enclosed shell until a bath of desired depth is formed. Liquid oxygen is vaporized from this bath in the lower portion of the enclosed shell and the resulting vapor passes upwardly for a relatively short distance, e. g., a distance at least approximately equal to the depth of the liquefied gas in the lower part of shell 11, with a linear velocity below approximately one foot per second. The vapor then passes around the end of the lowermost baffle 26 and traverses a portion of the finned vapor superheating section of the heating tubes 21. Due to the heat received from the finned portion of the tubes the vapor expands and passes with progressively increasing velocity over the remaining baffles and upper portion of the heating tubes and is discharged, as a relatively highly superheated gas at approximately room temperature, through conduit 24.

A modification of the invention is shown in Fig. 2 wherein the vaporizer comprises a vertical cylindrical vessel 30 having a pair of coiled vaporizing and superheating elements 31 and 32 disposed respectively in the lower and upper portions of the vessel. Each coil is so arranged as to have its axis parallel to the longitudinal axis of the cylindrical vessel 30. The outer diameter of the lower liquid oxygen vaporizing coil 31, which may be formed of plain copper tubing, is slightly less than the inside diameter of the vessel 30, and is suitably secured to the inner wall of the vessel 30 by a bracket 33. The upper superheating coil 32 is provided with exterior fins 34 and it is so constructed and arranged as to permit the outer edge of the fins to lie in close proximity to or contact the inner surface of the wall of the vessel 30. A cylindrical baffle 35, closed preferably at its upper end and having a diameter equal to the inner diameter of the finned coil 32 is disposed within the latter and is adapted to restrict the upward flow of gas to the annular space between the cylindrical baffle and the inner wall of the vessel. This space is partly occupied by the finned superheating coil 32 and the upwardly rising vapor passes across the fins of said coil at progressively increasing velocities.

The upper end of the vaporizing coil 31 is connected to the lower end of the superheating coil 32 preferably by an external conduit 36 and a heating medium, which may be any of those mentioned previously in connection with the apparatus of Fig. 1, is caused to pass upwardly from the inlet 37 of the vaporizing coil 31 through the latter, conduit 36, superheating coil 32 and out of the latter by a discharge conduit 38. A liquid oxygen inlet conduit I' and a gaseous oxygen outlet conduit O' are disposed respectively in the lower and upper portions of the vessel 30. The gaseous oxygen outlet conduit O' is provided with a control valve 39. A safety valve 40 is also provided in the upper portion of vessel 30.

The operation of the vaporizer is similar to that described in Fig. 1. By way of illustration, a suitable heating fluid, such as water at a suitable temperature, e. g., 70° F., is supplied to the inlet 37 of the vaporizing coil and in such an amount that during normal operation the water outlet temperature does not permit the formation of ice within the vaporizing and superheating coils. After the heating fluid is circulating properly through the vaporizing and superheating coils 31 and 32, valve 39 is opened and liquefied gas such as liquid oxygen, at a temperature of 90° K. or less, is permitted to enter the lower portion of the vaporizer through inlet conduit I' and to form a bath of a depth sufficient to contact with the vaporizing coil 31. During normal operation, the bath of liquefied gas, e. g., liquid oxygen, preferably covers between about 38% and 54% of the total heating surface of the vaporizing coil 31 (the coil being more submerged the greater the oxygen demand on the vaporizer), the remainder of the heating surface of the coil being adapted to evaporate any entrained liquid oxygen which might be carried upward with the rising vapor. The rate of heating of the liquefied gas by the coil 31 and the vapor releasing surface of the liquid are so related that the linear velocity of the vapor leaving the liquefied gas is below about one foot per second and preferably below about one-half foot per second. Thus, by permitting the vapor to be evolved from the liquid at this low rate violent ebullition of the liquid is eliminated although the temperature difference between heating fluid and liquefied gas is relatively great. The relatively slowly moving vapor is then passed upwardly over the finned superheating coil 32 which is disposed in the relatively long and narrow annular space between the wall of the vessel 30 and the cylindrical baffle 35. Due to the heat absorbed by the vapor and its consequent expansion, the heated vapor passes with progressively increasing velocity across the finned superheating coil 32, thus permitting a comparatively high rate of heat transfer to be obtained.

During normal operation, the inlet water temperature and the temperature of the liquefied gas supplied to the vaporizer are usually maintained at relatively uniform values, and the difference in temperature between the exit water and gaseous oxygen, e. g., which may be about between 20° to 35° F., may be used as a criterion for estimating the rate of oxygen flow through the vaporizer.

If it is desired to shut down the apparatus, the control valve 39 is first closed and the resulting increase in pressure in the vessel 30 is sufficient to force the residual liquefied gas, such as liquid oxygen remaining in the vaporizer back through the liquid inlet conduit I' to the source of supply, thus preventing further vaporization. Thereafter the heating medium need be no longer circulated through the heating coils 31 and 32.

With reference to Fig. 3 the vaporizer is shown connected to a suitable source of fluid heating medium 41 which is preferably disposed at a point below the vaporizer coil 44. This source of heating fluid may be obtained from a high pressure oxygen compressor, a spray tower, etc. A heating fluid circulating pump P is disposed in the vaporizer heating fluid inlet conduit 42 at a point preferably below the liquid vaporizing and vapor superheating coils 43 and 44. The heating fluid outlet conduit 45 is provided with a check valve CV which is adapted to admit air to the heating system in the event of failure of the heating fluid circulating pump P, thus permitting heating fluid to drain back through the pump to its source 41 and prevent freezing of the heating fluid within the vaporizing and superheating elements 43 and 44. If heating fluid is inadvertently allowed to freeze in the heating elements, warm gas, such as oxygen, e. g., that obtained directly from the discharge of an oxygen compressor may be introduced into the bottom of the vaporizer through conduit 46 by opening valve 47. This gas is discharged at the top of the vaporizer through valve 50. The liquid oxygen supply conduit 48, in such event, should be closed by valve 49. After the coils are properly thawed out, warm oxygen inlet valve 47 is closed and after the heating fluid is properly circulating through the heating elements, valves 49 and 50 are again opened thus placing the vaporizer in operation.

While certain embodiments of the invention have been illustrated and described, it will be obvious to those skilled in the art that the invention may be otherwise embodied and practiced without departing from the principles or scope of the invention.

I claim:

1. In a method of vaporizing a volatile liquid having a boiling point temperature below about 233° K. at atmospheric pressure and superheating the resulting vapor, the steps of heating said liquid to effect evaporation thereof at a rate such that the linear velocity of the resulting vapor is insufficient to cause entrainment of liquid in the evolved vapor, and thereafter superheating said vapor to substantially room temperature by passing said vapor at relatively higher velocities in direct contact with heating elements disposed across the path of flow of said evolved vapor.

2. In a method of vaporizing and superheating a liquefied gas having a boiling point temperature below about 233° K. at atmospheric pressure, the steps of heating a bath of said liquefied gas to vaporize the latter, said heating being effected by passing a heating medium through said bath in indirect contact therewith and employing at least part of the heat of said medium to effect such vaporization; and superheating such vaporized gas by bringing the latter into direct contact with heating elements disposed in the path of flow of said gas, the heat for said elements being provided by passing a heating medium through said elements after at least part of said medium has passed through said bath.

3. In a method of vaporizing a liquefied gas having a boiling point temperature below about 233° K. at atmospheric pressure and thereafter superheating the resulting vapor, the steps of vaporizing a bath of said liquefied gas by passing a heating medium through said bath in indirect contact therewith, the rate of heating and the vapor releasing surface of said bath being so related that the linear velocity of the vapor leaving said surface is below approximately one foot per second and that a portion only of the heat of said heating medium is transferred to said liquefied gas; and thereafter superheating said vaporized gas by passing it at relatively higher velocities in indirect contact with said heating medium after the latter has passed through said bath.

4. In a method of vaporizing liquid oxygen, and thereafter superheating the resulting vapor, the steps of vaporizing liquid oxygen in a chamber by passing a heating medium through said chamber in indirect contact with said liquid oxygen, the rate of heating being so correlated to the vapor releasing surface of said liquid oxygen that the linear velocity of the vapor leaving said liquid oxygen is less than approximately five-tenths of a foot per second and that a portion only of the heat of said heating medium is transferred to said liquid oxygen; allowing said vapor to move at substantially said linear velocity upwardly in said chamber to a point above said liquid oxygen; and thereafter superheating said vapor at considerably higher linear velocities in indirect contact with said heating medium after the latter has passed through said liquid oxygen.

5. A method of vaporizing liquid oxygen as claimed in claim 4, wherein water is employed as said heating medium and is introduced into said chamber at approximately room temperature.

6. In a method of vaporizing liquid oxygen, and thereafter superheating the resulting vapor, the steps of vaporizing said liquid oxygen in an enclosed chamber by passing a heating medium around and through said chamber in indirect contact with said liquid oxygen, the rate of heating and the vapor releasing surface of said liquid oxygen being so related that the linear velocity of the vapor leaving said surface is less than five-tenths of a foot per second and that a portion only of the heat of said heating medium is transferred to said liquid oxygen; allowing said vapor to move upwardly at substantially said linear velocity in indirect contact with said heating medium to a point above said liquefied gas; and thereafter superheating said vapor within said chamber to approximately room temperature by passing said vapor at considerably higher linear velocities in indirect contact with said heating medium after the latter has passed through said liquid oxygen.

7. A vaporizer for vaporizing and superheating a liquefied gas, said vaporizer comprising a vaporizing chamber containing a bath of said liquefied gas and liquid heating means disposed in said bath for vaporizing said liquefied gas, said vaporizing chamber being constructed and arranged to provide a relatively large area for release of vapor and to cause such released vapor to flow with relatively low linear velocity; a superheating chamber disposed above and in spaced relation to the free surface of said bath of liquefied gas and having vapor superheating means therein, said superheating chamber being constructed to have a vapor passage of reduced cross-sectional area to superheat said vapors at relatively greater velocity, said liquid heating means and said vapor superheating means having passages for conducting a heating fluid through said chambers and being connected in series to permit heating fluid to pass first through said liquid heating means and thereafter through said superheating means.

8. A vaporizer for vaporizing and superheating a liquefied gas having a boiling point below 233° K. at atmospheric pressure, said vaporizer comprising a vaporizing chamber containing a bath of said liquefied gas and a liquid heating element disposed in said bath for vaporizing said liquefied gas; and a superheating chamber having a superheating element disposed above and in spaced relation to the free surface of said bath of liquefied gas, the surface of said liquid heating element and the free surface of said bath being correlated so as to effect vaporization of said liquefied gas at a linear velocity not in excess of about 1 foot per second.

9. A liquefied gas vaporizer comprising, in combination, an outer housing and an inner shell disposed in spaced relation to said outer housing, said inner shell being provided with a plurality of vertically disposed tubes adapted to form heating fluid passages within said inner shell and to permit fluid communication between the upper and lower portions of said outer housing, said inner shell having an upper superheating section and a lower liquefied gas containing and vaporizing section, both sections being arranged in gas communicating relation, said superheating section having a plurality of baffles disposed across said tubes, the latter being provided with fins along a portion thereof between the lowermost baffle and the upper end of said inner shell; means for supplying heating fluid to said vaporizing section; means for discharging said fluid at a point above said inner shell; means for introducing liquefied gas to said vaporizing section; and means for discharging superheated gas from said superheating section.

10. A liquefied gas vaporizer comprising, in combination, a vertical cylindrical vessel having a pair of tubular heating fluid coils disposed respectively in the upper and lower portions of said vessel, each of said coils having its axis substantially parallel to the longitudinal axis of the vessel, the upper end of said lower coil being connected to the lower end of said upper coil, said lower coil being adapted to vaporize liquefied gas and said upper coil being adapted to superheat said vaporized gas; a closed cylindrical baffle disposed within said upper coil; means for supplying liquefied gas to the lower portion of said vessel; and gas outlet means disposed at a point above said upper coil for discharging said superheated gas from said vessel.

11. A liquefied gas vaporizer as claimed in claim 10, in which the exterior surface of said upper coil is provided with fins disposed substantially across the path of flow of said vaporized gas.

12. A vaporizer for vaporizing and superheating liquid oxygen, said vaporizer comprising a cylindrical casing containing a bath of said liquid oxygen and heating tubes disposed within said casing and in said bath for vaporizing said liquid oxygen, the area of the surface of said heating tubes and the area of free surface of said bath being correlated so as to effect vaporization of said liquid oxygen at a linear velocity not in excess of about 1 foot per second; and a cylindrical superheating chamber disposed above and in spaced relation to said vaporizing chamber, finned heating tubes within said superheating chamber and having a plurality of baffles for guiding said vapors across said tubes to superheat the vaporized oxygen at relatively higher velocity, said vaporizing heating tubes and said superheating tubes being connected in series to permit heating fluid to pass first through said vaporizing tubes and thereafter through said superheating tubes.

GEORGE H. ZENNER.